United States Patent [19]

Eldridge

[11] Patent Number: 4,767,912
[45] Date of Patent: Aug. 30, 1988

[54] HIGH FREQUENCY ARC STABILIZER
[75] Inventor: Richard Eldridge, Chicago Ridge, Ill.
[73] Assignee: ESAB Welding Products, Inc., Chicago, Ill.
[21] Appl. No.: 900,166
[22] Filed: Aug. 25, 1986
[51] Int. Cl.[4] .............................................. B23K 9/06
[52] U.S. Cl. ............................ 219/130.4; 219/137 PS
[58] Field of Search ......................... 219/130.4, 137 PS

[56] References Cited
U.S. PATENT DOCUMENTS
3,876,855 4/1975 Hirasawa et al. ................ 219/130.4
4,418,265 11/1983 Tabata et al. ..................... 219/130.4

Primary Examiner—Clifford C. Shaw
Attorney, Agent, or Firm—James G. Staples

[57] ABSTRACT

A high frequency arc stabilizing circuit includes a free running oscillator for generating a non-synchronized square wave. An output from the oscillator is buffered and inverted. The asserted and inverted outputs drive field effect transistors coupled to the primary of a high voltage step-up transformer. The circuit can also be gated so as to only operate during selected time intervals.

6 Claims, 3 Drawing Sheets

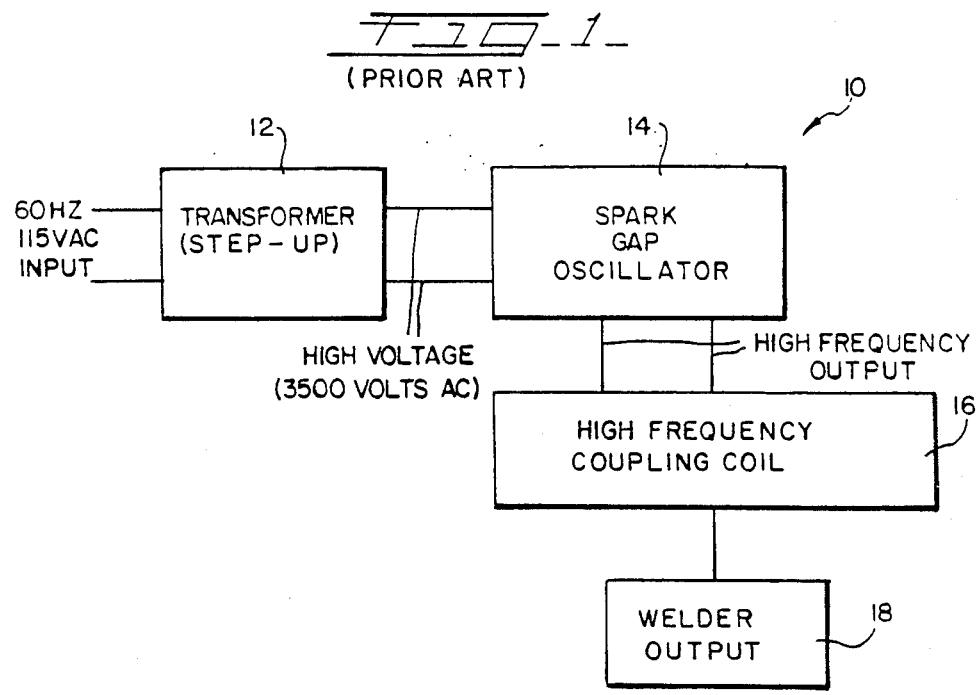
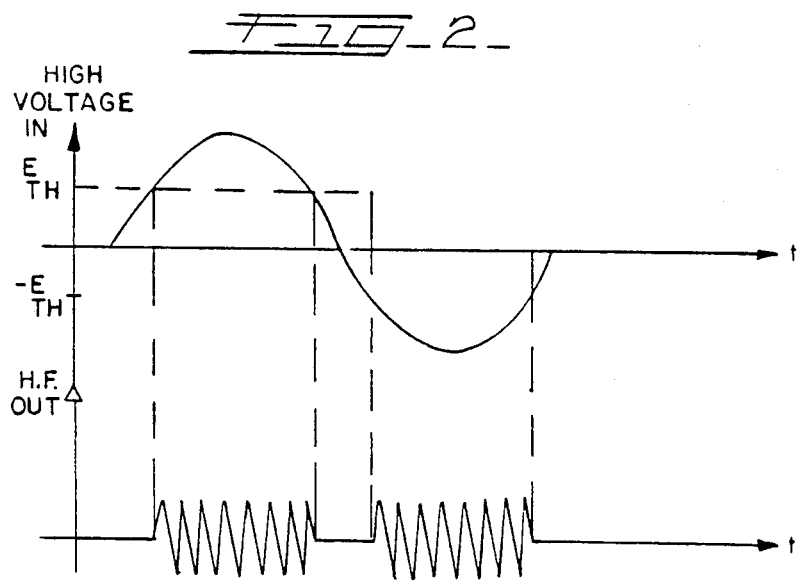

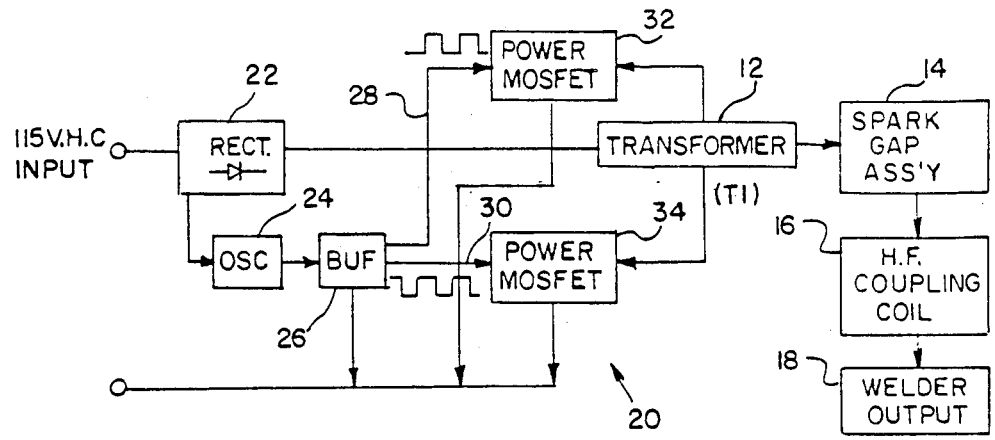
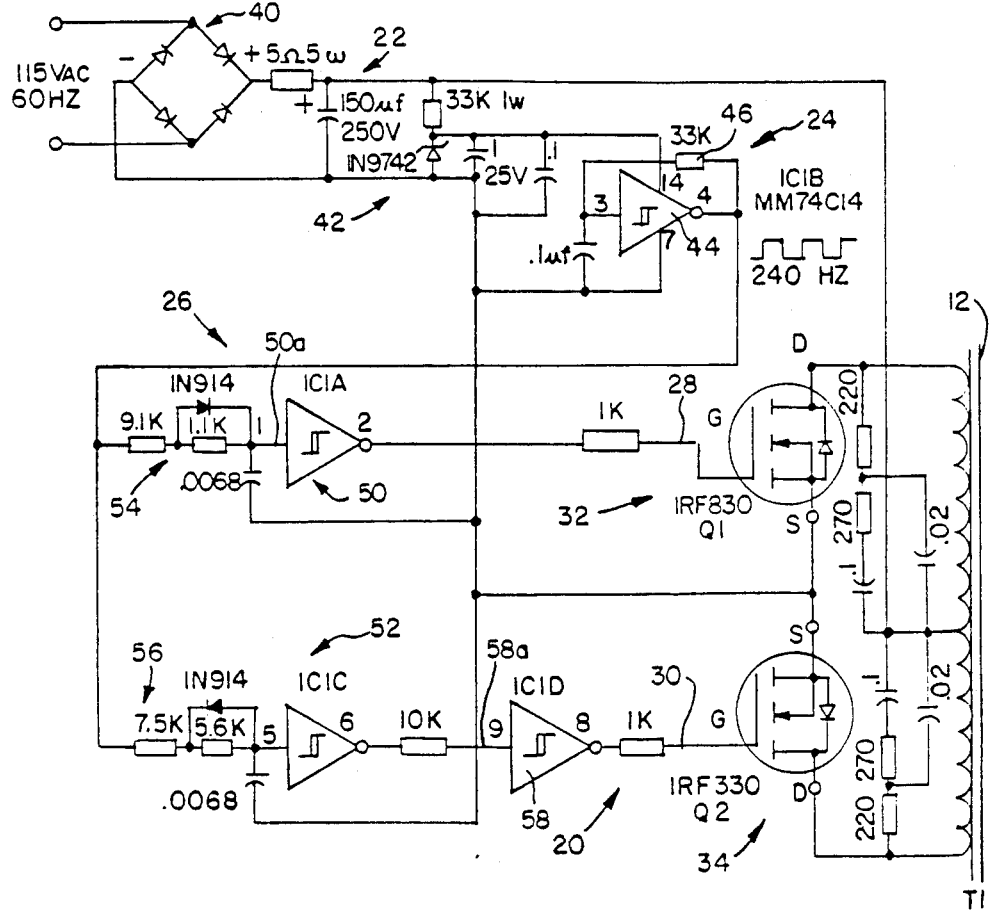

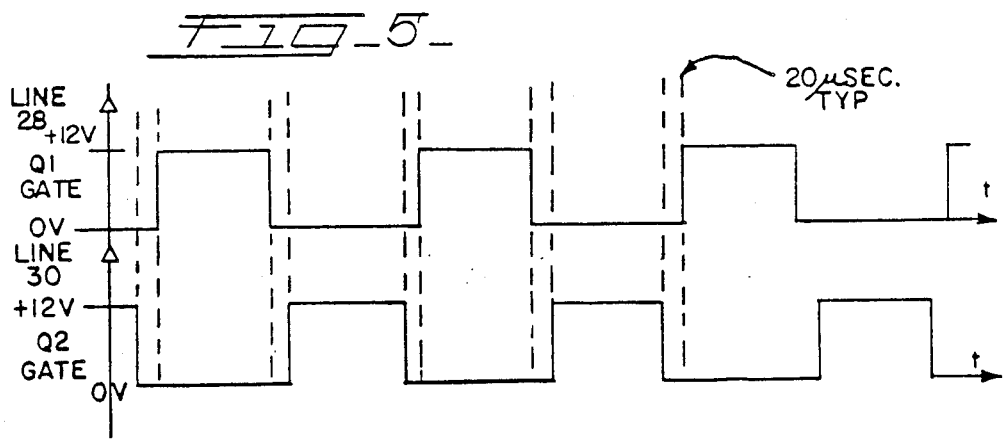
FIG-5-
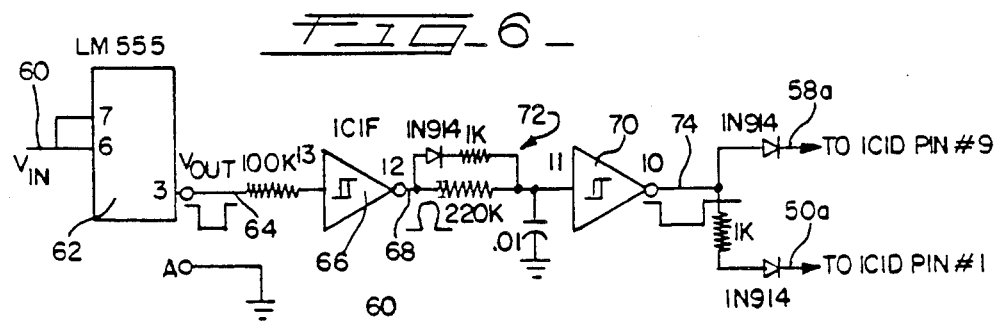
FIG-6-
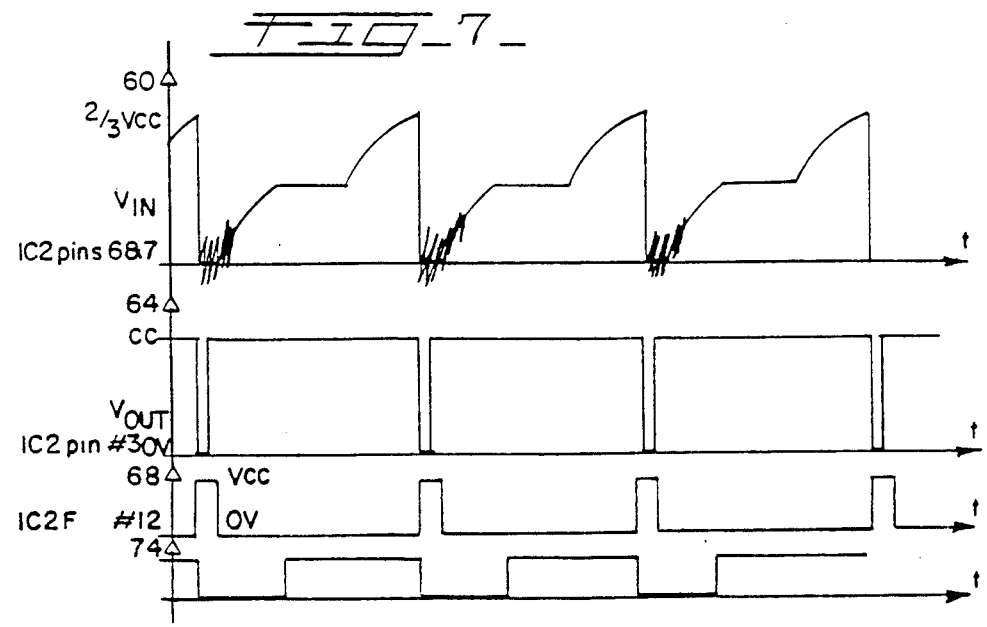
FIG-7-

HIGH FREQUENCY ARC STABILIZER

FIELD OF THE INVENTION

The invention pertains to apparatus and methods for stabilizing welding arcs. More particularly, the invention pertains to methods and apparatus usable in connection with AC or DC tig welding devices to maintain continuity of the welding arc during oscillations of the output voltage or while initiating the arc.

BACKGROUND OF THE INVENTION

Both AC and DC tungsten-inert gas (tig) welding devices are generally known in the art. In such devices, a hollow housing is provided with a tungsten electrode positioned therein. An inert gas such as argon is expelled under pressure from the open front end of the housing. The inert gas surrounds the tungsten electrode as well as the region of metal to be welded.

It has also been known, with respect to tig welding, that it is necessary to supply a high voltage, on the order of 3500 volts or so to break down the gas and start the arc. Conventionally, a spark gap oscillator has been used in the prior art for this purpose. The spark gap oscillator will generate a 3500 volt, relatively high frequency, output signal which can be used to ionize the inert gas and thereby start the arc.

Conventionally, in prior art systems, the spark gap oscillator has been powered by 60 Hz line voltage through a step-up transformer to generate a 60 Hz high voltage input signal, on the order of 3500 volts, which is then used to power the spark gap oscillator. However, the same 60 Hz signals are also used to provide output voltage and current to the tungsten electrode and the metal members being welded.

As a result, the high voltage input to the spark gap oscillator can be in phase with the welder output voltage and current.

In addition to being used to initiate the arc, in AC tig welding equipment, the output of spark gap oscillator is critical to maintaining the ionized condition of the inert gas during time intervals when the output voltage is going through zero and changing polarity. Without the high frequency signal from the spark gap oscillator during these transition periods, the arc will become extinguished.

However, the input AC voltage has to exceed a predetermined threshold before the spark gap oscillator receives a high enough voltage to result in the air gaps breaking down to produce the desired oscillation. There is thus a dead zone when the input AC voltage to the spark gap oscillator is below this predetermined threshold. This dead zone will occur during the same time intervals that the output voltage is also crossing through zero, provided the voltage to the spark gap oscillator is in phase with the output voltage. Hence, the time when the output voltage should be receiving the high frequency signal from the spark gap oscillator so as to maintain the inert gas in its ionized condition is exactly the time when the spark gap oscillator will cease to function.

To avoid this problem, it has been known generally to shift the phase between the output AC voltage and the AC voltage input to the spark gap oscillator. This solution has had some measure of success. However, newer tig welding machines with wave balance controls have varying points at which the output voltage transitions through zero due to the output current and the wave balance setting.

In such machines a phase shifting circuit does not solve the problem completely. Due to the asymmetrical shape of the output wave form it may not be possible to adjust the phase of the spark gap oscillator input voltage so that the oscillator is functioning at all times that output transitions occur. Hence, the results of this solution tend to be inadequate.

Thus, there continues to be a need to be able to drive the spark gap oscillator so as to minimize or completely eliminate dead zones in the output thereof. Further, it would be desirable to be able to not only incorporate such driving circuitry into new machines but to be to able to retrofit existing tig welding units so as to eliminate this dead zone.

SUMMARY OF THE INVENTION

The invention provides an apparatus and method for high frequency arc stabilization of a welder. The apparatus is usable with a welder having a high frequency spark gap generator.

The apparatus includes a relatively high frequency oscillator which is not synchronized to the alternating current voltage used to power the welding equipment. This oscillator is coupled through buffering circuits so as to form two pulse trains, one inverted with respect to the other. The two pulse trains are coupled through a high voltage step-up transformer which generates a high voltage rectangular wave for the purpose of driving the spark gap oscillator.

The essentially instantaneous transitions of the high voltage rectangular wave used to drive the spark gap generator result in essentially continuous high frequency output from that oscillator.

The non-synchronized oscillator can be implemented with a Schmitt trigger. The output from the oscillator can be passed through first and second Schmitt triggers with one of the outputs being inverted, to provide two rectangular out-of-phase driving signals. The driving signals can each be coupled to a gate input of an MOS field effect transistor. The MOS field effect transistors can in turn be coupled to the high voltage step-up transformer which in turn drives the spark gap oscillator.

Further, in accordance with the invention a method can be provided for stabilizing a tig welding arc. The method can include the steps of: generating a repetitive, non synchronized electrical signal with at least two voltages of differing values with transitions from one voltage to the other voltage which occur substantially instantaneously; and coupling this non-synchronized electrical signal to a high frequency spark gap oscillator which in turn will generate a essentially continuous high frequency, high voltage output signal feasible to stabilize the arc.

The invention also provides a system for gating the out of phase driving signals. By gating the driving signals off of selected power initiating pulses, the high voltage, high frequency stabilizing signal can be limited to a few milliseconds during which the output voltage is crossing through zero volts. As a result, the welder control system is subjected to substantially less electrical noise.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE DRAWINGS

FIG. 1 is a block diagram of a generally known arc stabilizer system usable with a tig welder;

FIG. 2 is a plot of sinusoidal high voltage input to the arc stabilizer of FIG. 1 and a plot of the high frequency output of the spark gap oscillator illustrating the presence of a dead zone;

FIG. 3 is a block diagram of an arc stabilizer in accordance withe present invention;

FIG. 4 is a detailed electronic schematic of an arc stabilizer in accordance with the present invention;

FIG. 5 illustrates driving voltages of the circuitry of FIG. 4 as a function of time;

FIG. 6 is an electronic schematic of a gating circuit usable with the arc stabilizer of FIG. 4; and FIG. 7 is a timing diagram illustrating various waveforms found in the gating circuit of FIG. 6.

DETAILED DESCRIPTION OF THE PREFERRED EMBODIMENT

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a prior arc high frequency arc stabilizer 10 of a type generally known. The arc stabilizer 10 includes a step-up transformer 12 which transforms 60 Hz, 115 volts AC input to 60 Hz, 3500 volt output. The high voltage step-up transformer 12 provides electrical input to a spark gap oscillator 14 of a known type. The high frequency output of the spark gap oscillator 14 is coupled by a high frequency coupling coil 16 to the welder output 18. The system 10 could be used with AC or DC welders.

FIG. 2 illustrates a sinusoidal high voltage input to the spark gap oscillator 14 as a function of time and high frequency output from the spark gap oscillator 14. As can be seen from FIG. 2, a dead zone exists when the input voltage falls below predeterminable threshold values $E_{TH}$, $-E_{TH}$ as it approaches the zero volts periodically. This results in a dead zone in the high frequency, high voltage output of the spark gap oscillator 14.

If a rectangular input wave is provided to the spark gap oscillator 14, having essentially instantaneous transitions between first and second voltage levels, the dead zone in the high frequency output voltage can be essentially eliminated. The block diagram of FIG. 3 is an arc stabilizer system 20 which eliminates the dead zone in the high frequency output of the spark gap oscillator 14.

The system 20 is illustratively powered off of 115 volts AC, 60 Hz. The input alternating current and voltage are rectified and filtered in a power supply 22. The power supply 22 powers a free running or astable oscillator 24.

The oscillator 24 can be implemented in a variety of ways. The exact implementation of this oscillator is not a limitation of the present invention. The output signal of the oscillator 24 can be set to a variety of frequencies. One frequency. which has been found useful is 240 Hz. The output frequency of the oscillator 24 is asynchronous with respect to the input 60 Hz signal.

Buffer circuits 26 generate an asserted and a negated rectangular signal on first and second output lines 28 and 30, respectively. The drive signals on the lines 28 and 30 provide input voltage to the gates of switching transistors 32 and 34, respectively. Preferably, the switching transistors 32 and 34 will be power MOS field-effect transistors which display a high input impedance at each gate input.

The field effect transistors 32 and 34 alternately drive the step-up transformer 12. Output from the step-up transformer 12, a high voltage, high frequency wave then provides input to the spark gap oscillator 14. Use of the system 20 results in the spark gap oscillator 14 generating an essentially continuous high voltage, high frequency output signal to the coupling coil 16.

FIG. 4 is an electronic schematic of the system 20. The power supply 22 includes a bridge rectifier 40 as well as filtering an output circuitry 42. The free-running oscillator 24 can be implemented with a single element 44 from a hex Schmitt trigger with an appropriate feedback loop 46. In this case, the feedback loop 46 is a 33K ohm resistor.

The 240 Hz square wave output signal from the oscillator 24 provides input to drivers 50 and 52. The resistor capacitor networks 54 and 56 coupled to the driver Schmitt triggers 50 and 52, respectively, will be discussed subsequently. Output from the driver 52 is inverted in a Schmitt trigger 58.

The rectangular wave forms or pulse trains on the lines 28 and 30 are thus essentially inverted with respect to one another. Electrical signals on the lines 28 and 30 are coupled to the gate inputs of high power MOS field effect transistors 32 and 34, respectively. The transistors 32 and 34 are in turn coupled to the primary of the transformer 12.

The system 20 can be installed on new tig welding equipment and can be retrofitted onto existing tig welding equipment.

The function of the resistor-diode networks 54 and 56 is to insure that the transistor 32 is completely turned off before the transistor 34 is turned on. FIG. 5 illustrates the effects of the networks 54 and 56. As can be seen, output on the line 28 is slightly out of phase with output on the line 30. The respective transitions are shifted approximately 20 microseconds with respect to one another. This insures that both transistors are turned off before an attempt is made to turn either one of them on.

While the circuitry of FIG. 4 above is effective to generate the high frequency arc stabilizing signals usable to start a DC tig arc and required for the continued maintenance of the AC tig arc, the continuously present high frequency, high voltage output signals from the spark gap oscillator 14 can disrupt the welding system control circuitry.

In welders which utilize silicon controlled rectifiers to switch the output current, a timing network is very often used which is triggered by a zero crossing detector. The zero crossing detector detects when the main transformer secondary voltage passes through zero. A selected interval of time later, a timing circuit then generates an output pulse which is utilized as a gate input pulse for the appropriate silicon sontrolled rectifier. However, if the high frequency noise generated by the spark gap generator 14 disrupts this process, incorrect gate pulses can be generated which can cause triggering of the silicon controlled rectifiers too soon.

It would be desirable to be able to gate the system of FIG. 4 such that the drive signals on the lines 28 and 30, the gate inputs to the field effect transistors 32 and 34 are only present for short periods of time when the output AC voltage is approaching a zero crossing. A schematic diagram for a system 60 which provides such a gating function is found in FIG. 6.

Input to the system 60 comes from LM 555 timer chip 62 which is found in existing tig welding equipment. The chip 62 generates SCR gate drive signals on a line 64 at appropriate time intervals in response to input signals on a line 66.

The downgoing signal on the line 64 can be used to turn on a selected silicon controlled rectifier. Output from the timer 62 on the line 64 can be used as input to a Schmitt trigger 66. The Schmitt trigger 66 inverts the signal on the line 64 and generates an output on a line 68. The positive going signal on the line 68 provides input drive to a Schmitt trigger 70 via a resistor-diode-capacitor network 72.

The effect of the network 72 is to stretch the downgoing output pulse from the Schmitt trigger 70. This pulse appears on a line 74. The downgoing signal output on the line 74 is coupled via diodes to lines 50A and 58A of FIG. 4.

The low or ground voltage on the line 74 permits the Schmitt triggers 50 and 58 to switch and respond to the input 240 Hz signal from the oscillator 24. Drive is then available for the field effect transistors 32 and 34. This then results in operation of the spark gap oscillator 14.

A high voltage on the line 74 will inhibit switching of the Schmitt triggers 50 and 58, thus inhibiting drive to the field-effect transistors 32 and 34. This blocks operation of the spark gap oscillator 14.

The duration of the low voltage present on the line 74 is set by the values in the network 72. The indicated values produce a 2 millisecond pulse width on the line 74.

In FIG. 7, high frequency noise is illustrated present on the line 66 during this 2 millisecond interval. This interval ends before the signals on the line 66 increase in value to the point where false SCR gate triggering pulses can be generated.

In addition to generally reducing the noise in the control system, the gating system 60 limits the power required to drive the spark gap oscillator 14 since it only functions for approximately 2 milliseconds during an 8 millisecond half period of the 60 Hz output voltage. It will be understood that use of the Schmitt triggers 66 and 70 is purely exemplary and is not a limitation of the present invention. Alternate forms of switching and inverting circuitry could be used without departing from the spirit and scope of the present invention.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A high frequency arc stabilizer for a welder having a high frequency spark gap oscillator coupled to a welding electrode with a variable output voltage having a predetermined period and applicable to the electrode, the stabilizer comprising:
   free-running oscillator means for continuously generating a varying electrical waveform of a selected frequency with two voltages of differing values wherein transitions from one of said voltages to the other of said voltages occur substantially instantaneously;
   means, coupled to said oscillator means, for forming two electrical pulse trains, each having a frequency substantially equal to said selected frequency with one of said pulse trains inverted with respect to the other and with both of said pulse trains simultaneously having a selected common value during predetermined time intervals;
   means for detecting when the variable output voltage is approaching a zero crossing; and
   means for coupling said two pulse trains to the spark gap oscillator for a predetermined interval of time, substantially less than said period, only in response to said detected zero crossing such that an intermittant high frequency output signal, initiated substantially when said approaching zero crossing is detected and extending for said predetermined time interval, is generated by the spark gap oscillator.

2. A high frequency arc stabilizer as in claim 1 with said selected frequency having a value in excess of 200 Hz.

3. A high frequency arc stabilizer as in claim 2 wherein the predetermined period has a value on the order of 16 milliseconds and with said predetermined time interval having a value less than 5 milliseconds.

4. A high frequency arc stabilizer as in claim 2 with said coupling means including first and second high impedance switching means for isolating said forming means from the spark gap oscillator.

5. A high frequency arc stabilizer as in claim 2 wherein said predetermined time interval has a ratio on the order of one quarter the length of the predetermined time period of the output voltage applied to the welding electrode.

6. A high frequency are stabilized as in claim 1 with said predetermined time interval having a value in a range from 1 to 3 milliseconds.

* * * * *